US010165133B2

(12) United States Patent
Simpson et al.

(10) Patent No.: US 10,165,133 B2
(45) Date of Patent: Dec. 25, 2018

(54) REGISTERING PRINTING DEVICES WITH NETWORK-BASED SERVICES

(71) Applicant: HEWLETT-PACKARD DEVELOPMENT COMPANY, L.P., Houston, TX (US)

(72) Inventors: Shell S. Simpson, Boise, ID (US); Timothy P. Blair, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/869,242

(22) Filed: Sep. 29, 2015

(65) Prior Publication Data

US 2017/0094077 A1    Mar. 30, 2017

(51) Int. Cl.
*H04N 1/00* (2006.01)
*G06F 3/12* (2006.01)

(52) U.S. Cl.
CPC ....... *H04N 1/00344* (2013.01); *G06F 3/1204* (2013.01); *G06F 3/1224* (2013.01); *G06F 3/1287* (2013.01)

(58) Field of Classification Search
CPC ........ H04N 1/00344; H04N 2201/0094; G06F 3/1287; G06F 3/1238
USPC ...................................... 358/1.14
See application file for complete search history.

(56) References Cited

U.S. PATENT DOCUMENTS

| 5,974,150 | A  | * | 10/1999 | Kaish ................... G06K 19/086 283/85 |
| 8,576,422 | B2 | * | 11/2013 | Kimura ................. G06F 3/1204 358/1.14 |
| 8,867,070 | B2 |   | 10/2014 | Jazayeri et al. |
| 2005/0286076 | A1 | * | 12/2005 | Cho ....................... G06K 1/121 358/1.15 |
| 2006/0277483 | A1 |   | 12/2006 | Yamamoto |
| 2011/0010497 | A1 | * | 1/2011 | Bryant-Rich ............. G06T 1/60 711/115 |
| 2011/0235085 | A1 | * | 9/2011 | Jazayeri ................ G06F 3/1204 358/1.14 |
| 2015/0370518 | A1 | * | 12/2015 | Ramchandran ......... G06F 11/30 358/1.15 |

FOREIGN PATENT DOCUMENTS

WO    WO-2014120168    8/2014

OTHER PUBLICATIONS

PaperCut Software International Pty. Ltd. Chapter 7. Advanced Printer Management.

* cited by examiner

*Primary Examiner* — Neil R McLean
*Assistant Examiner* — Darryl V Dottin
(74) *Attorney, Agent, or Firm* — Tong, Rea, Bentley & Kim LLC

(57) ABSTRACT

In one example, a method for registering a printing device with a network-based service is described. The method may include a printing device receiving a print request, where the print request comprises an image, determining that the image includes a command to connect to a server of a network-based service to register the printing device with the network-based service. The method may further include the printing device connecting to the server in response to the command and receiving a verification from the server that the printing device is registered with the network-based service.

20 Claims, 6 Drawing Sheets

100

REGISTERING PRINTING DEVICES WITH NETWORK-BASED SERVICES

BACKGROUND

Connecting a printer to the cloud is useful for a variety of reasons. For example, connecting a printer to the cloud allows the printer to be used remotely, such as when the printer is not connected to the local network, enables the scheduled printing of customized content, and enables monitoring in managed printing service (MPS) engagement. In one example, printers may be associated with an online service by selecting a menu item on the control panel of the printer that prints registration instructions. These registration instructions may require a user to follow a web link to a webpage where the user may be required to login or enter account credentials, and to then enter a registration code in order to associate the printer with the online service.

DETAILED DESCRIPTION

Figure 1:
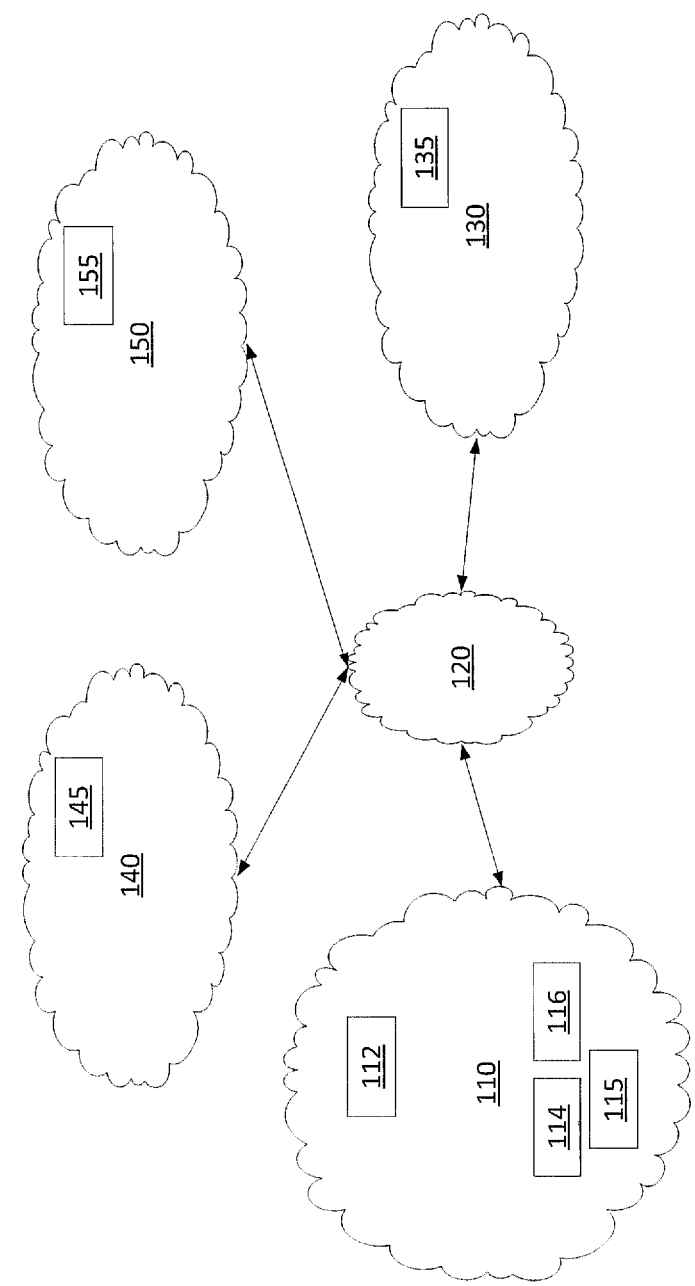
FIG. 1 illustrates a block diagram of an example system of the present disclosure.

In one example, the present disclosure describes a device, method, and non-transitory computer-readable medium for registering a printing device with a network-based service. For example, a printing device may receive a print request, where the print request comprises an image, and determine that the image includes a command to connect to a server of a network-based service to register the printing device with the network-based service. The printing device may further connect to the server in response to the command and receive a verification from the server that the printing device is registered with the network-based service.

In another example, the present disclosure describes a device, method, and non-transitory computer-readable medium for registering a printing device with a network-based service. For example, a server of a network-based service may associate a user account of the network-based service with a user device, provide to the user device an image that includes registration data and a command for a printing device to connect to the network-based server to register the printing device with the network-based service, and receive a registration request from the printing device to register with the network-based service. In one example, the registration request may include the registration data that is included in the image and an identification of the printing device. In one example, the image may be received by the printing device in response to a print request from the user device to print the image, the printing device may extract the command and the registration data from the image, and the registration request may be received by the server in response to the printing device executing the command. The server of the network-based service may then associate the user account of the network-based service with the printing device and provide a verification to the user device that the printing device is registered with the network-based service.

The present disclosure describes associating a printing device with a network-based service, e.g., an online service and/or a cloud-based service that is provided over one or more communication networks. A printing device may be purchased, leased, or otherwise obtained and placed into service within a network of a home, a business, an academic institution, a charity, and so forth. Each of the foregoing types of networks may be referred to a "local network" in accordance with the present disclosure. In addition, the manufacturer of the printing device, a service company, a cloud-based desktop provider, an email provider, a social networking provider, and various other entities may each provide a network-based service that may rely upon communications to and from the printing device. However, the network-based service providers may be unaware of the control and ownership of the printing device. In addition, users may desire to control which network-based services may have access to the printing device. Thus, a user may first register the printing device with network-based services in order to affirmatively grant access to the printing device for the network-based services and to enable communications between the printing device and the network-based services, e.g., servers and other components that provide the physical infrastructure for the network-based services. In accordance with the present disclosure, a printing device may comprise such devices as: a personal printer, an ink-jet printer, a laser-jet printer, a digital press or digital printing press, an offset printing press, a printer-copier, a printer-scanner, a printer-copier-scanner, a printer-copier-fax, and so forth.

In one example, a user may register a printing device with a network-based service by printing an image, e.g., contained on or accessed via a designated webpage that is provided by the network-based service to a web browser of a user device. The image may contain a command, or instructions, to connect to a server of the network-based service and registration data for the printing device to be associated with the network-based service. The printing device may recognize certain characteristics of the image being printed and extract the command and registration data therefrom. The printing device may then contact the server of the network-based service and provide the extracted registration data and an identifier of the printing device in order to associate the printing device with the network-based service. The server of the network-based service may then transmit confirmation of the registration to the user device via the web browser.

In one example, a command to connect to a server of a network-based service is encoded in visual data of an image. The image content of the webpage that is sent to the printing device for printing contains encoded information that may be recognized by the printing device as a command, rather than as a normal print page. In one example, the printing device firmware is programmed to recognize information in the image of the print request as a command, rather than as content to be printed. One encoding format may comprise a solid bar of black, followed by a bar code, followed by failover instructions. The solid bar of black may signal that a command bar code follows. The bar code may provide the actual command, including both instructions to connect to the server and registration data, as well as a checksum to prove that the bar code was interpreted correctly. The failover instructions may provide instructions, e.g., in readable text format, for an alternate (manual) way to connect, if automatic registration fails. In one example, when the printing device recognizes that the image to be printed includes a command rather than an actual page to be printed, the printing device does not print the image. However, if the automatic registration of the printing device with the network-based service fails, the printing device may then print the failover instructions. In another example, the command may take the form of a two-dimensional bar code or a quick response (QR) code, a color coded image, e.g., a multicolored bar code, and so on. In general, a variety of different visual encoding formats may be utilized in connection with the present disclosure.

In one example, the encoding format is selected such that the printing device is resilient to transformations of the image. In other words, the printing device should be able to recognize that the image received for printing is a command rather than an actual page to be printed. For example, an image may be submitted to a printing device from a variety of different user devices having a variety of different computing architectures, browsers, print drivers, print parameters, and so forth. Thus, the encoding format may be selected such that the printing device may recognize the command contained within the image regardless of the type of user device from which the print request is submitted, regardless of the print parameters, e.g., whether portrait or landscape, irrespective of the paper size and margins selected, and so forth. As such, in one example the present disclosure does not utilize any customized printing software for the user device. In addition, in one example, the browser, the printing driver, the operating system, and other software of the user device do not impact the processes of the present disclosure.

Thus, examples of the present disclosure facilitate the registration of a printing device with a network-based service. A user may follow a single workflow on a user device via a web browser. In the context of interacting with the network-based service, the user can simply send a print request from the user device to print an image from a webpage on the printing device that the user is attempting to register with the network-based service. The printing device may then automatically register with the network-based service using the information contained within the image contained in the print request. The user may receive confirmation of the registration of the printing device via a message from the network-based service to the user device. The user does not need to change context. In other words, the user interacts with the network-based service via the user device throughout the entire process. The user does not need to retrieve any pages from the printer or follow any manual instructions from a printed page in order to complete the registration. In addition, the user need not be in physical proximity to the printer, e.g., as long as the printer is deployed in a same local network as the user device.

Examples of the present disclosure may also be used to enroll a fleet of printing device by performing the registration process for one of the printing devices in the fleet. For example, a printing device may first be detected anonymously by a network-based service. For instance, the printing device may be programmed to connect to the network-based service upon being connected to any network that has access to the Internet. In one example, as part of a setup process for a printing device a user may authorize the printing device to connect to the network-based service. However, at this point, the printing device may not be not associated with any particular account of the network-based service. In other words, the network-based service may not know who purchased and who is operating the printing device, even though the printing device has connected to the network-based service.

In one example, the network-based service may also determine which printing devices that have been anonymously detected by the network-based service are located on the same local network. A set of printing devices that are determined to be on the same local network may be referred to as a fleet. In one example, registering one of the printing devices in the fleet with the network-based service demonstrates that the entity performing the registration has access to the fleet. Accordingly, in one example, a registration of a single printing device in accordance with the present disclosure may further serve to register an entire anonymous fleet of printing devices. Rather than sending a print request to each printing device in the fleet, a single print request may be sufficient to register all of the printing devices. This may be beneficial to a network administrator when setting up a large number of printing devices at the same time, for example. This approach could also be used to automate the process of registering multiple printing devices with intranet services.

A registration of a printing device with various types of network-based services may be provided via examples of the present disclosure. For instance, one type of network-based service may comprise an online ordering system that checks the printing fluid (e.g., ink, toner, etc.) levels and statuses of print cartridges in the printing device. When a cartridge needs to be reordered, the network-based service may automatically reorder the cartridge. A connection between the network-based service and the printing device may be maintained for this purpose after the registration is completed. This is in contrast to other solutions that may require downloading software onto a user device for monitoring the status of the printing device. The software on the user device may monitor the printing device and transmit the status information of the printing device to the online ordering system. However, this solution may require the user to set up and configure the software to detect and monitor printing devices on the local network. The present disclosure, on the other hand, may not require any customized software to be installed on the user device. Instead, the user may navigate to a designated webpage with a particular image and send the image to the printing device in a print request, where the printing device may then register with and establish the connection to the network-based service.

This type of network-based service may be used in connection with residential and/or small office-home office (SOHO) printing devices or in connection with business and or commercial printing devices, e.g., for managed print services (MPS) where businesses do not own, but rather lease printing devices. For example, a service provider may contract with a business entity to maintain a printing device, to supply printing fluid cartridges, and so forth. The service provider may come periodically to exchange cartridges, or may ship cartridges to the business entity to replace themselves. In either case, the printing device may be connected to a network-based service for the service provider to monitor the status of the printing device with respect to functionality, printing fluid levels, number of staples, and so forth.

Another network-based service may comprise a network-based print server. For example, rather than having a print server in a local network of the printing device, there may be a cloud-based, or network-based print server. For example, a user may utilize a cloud-based desktop to create, edit and print documents, i.e., printing directly from the cloud-based desktop.

In one example, a first network-based service may function as a gateway for a number of different network-based services to connect to the printing device. To illustrate, a user may navigate to a webpage designated by the gateway network-based service, e.g., using a uniform resource locator (URL) or a similar type of address or link, and send a print request to the printing device containing an image from the webpage. The printing device may extract a command and registration data from the image and connect to a server of the gateway network-based service in order to register with the gateway network-based service. A number of different network-based services may then be provided via the gateway network-based service, such as printing device resource monitoring service for monitoring statuses of printing fluid cartridges and other aspects of the printing device, and for re-ordering supplies, a service for printing newspapers and other periodicals, a network-based print server service, and so forth. Thus, the printing device may be registered with the gateway network-based service, and all of the other network-based services may connect to the printing device through the gateway network-based service. For example, a user may interact with the gateway network-based service via a user device to provide authorizations for additional network-based services to access the printing device.

In another example, a number of different network-based services may each connect to the printing device without the gateway network-based service as an intermediary. For example, a user may navigate a browser of a user device to a first URL, access a first webpage, and send a print request comprising a first image from the first webpage encoded with a command and registration data to the printing device in order to register with the first network-based service. The user may then use the browser of the user device to navigate to a second URL, access a second webpage, and send a print request comprising a second image from the second webpage encoded with a command and registration data to the printing device in order to register with the second network-based service.

In one example, where different network-based services connect to the printing device without a gateway network-based service, the command and registration data contained in the image provided via the designated webpage may be digitally signed by the manufacturer of the printing device. Thus, in one example, network-based services that have been approved as trustworthy and as compatible with the printing device may be provided with the digital signature. In another example, the manufacturer of the printing device may generate the content of the command and the registration data that is included in the image provided via the webpage of a network-based service. In either case, the network-based service may be provided by an entity different from the printing device manufacturer, where the network-based service has a trusted relationship with the printing device manufacturer that allows it to connect to the user's printing devices. In addition, it is possible to add network-based services that are developed after the printing device has been sold by simply providing different URLs with different encoded images for different network-based services, e.g., so long as the proper command structure is utilized and so long as the command sent in the visual image data to the printing device is properly signed by the device manufacturer.

In one example, a printing device of the present disclosure is capable of sending communications to a network-based service (e.g., to a server of the network-based service) and receiving instructions from the network-based service to complete registration and to engage in further communications with the network-based service, e.g., for printing, for reporting status, and so forth, once registered. For example, a printing device may include a network interface card (NIC) for wired and/or wireless Ethernet communications, and the like. In one example, a network connection of a printing device may be proxied through a user device. This configuration may entail additional operations to register with a network-based service as compared to a printing device that is connected to a local network without a proxy. However, the present disclosure still enables the user to avoid performing additional software configuration beyond setting up the networking capability of the printing device through the user device. In other words, since customized monitoring software does not need to be installed on the user device, there is still no need to print instructions for registering the printing device with a network-based service or to perform manual tasks to provide registration data to the network-based service, and so forth.

In one example, a connector in the printing device recognizes a command to register with a network-based service and carries out the registration, but once registered the connector is also the connection vehicle between the printing device and the network-based service. In other words, the connector remains a conduit for all ingoing and outgoing communications once registered with the network-based service. For example, a stored credential may be provided in the printing device, e.g., contained within a hardware, firmware, a trusted software module, and so forth, such as a hash-based key, a security token, or an authentication code. The command to register may be digitally signed such that the digital signature may be authenticated by the printing device with the stored credential contained on the printing device. Thus, the printing device may execute the command to register when it is verified that the command provided via the image is authentic and is originated by the device manufacturer and/or by a trusted entity that is providing a network-based service. In addition, further communications to and from the network-based service may be routed through the connector to utilize the stored credential, such that the printing device does not respond to communications from unauthorized network-based services, or other unauthorized entities. These and other aspects of the present disclosure are described in greater detail below in connection with the example FIGS. 1-6.

FIG. 1 is a block diagram depicting one example of a network, or system 100. The system 100 may comprise various types of networks that are interconnected to provide communications between devices in connection with examples of the present disclosure. As illustrated in FIG. 1, the system 100 includes a local network 110, a communication network 120, a first network-based service provider network 130, and additional network-based service provider networks 140 and 150. In one example, local network 110 may comprise a residential or SOHO network, a network of a business, academic institution, and so forth. Local network 110 may comprise any one or more of a transmission control protocol/Internet Protocol (TCP/IP) network, an Ethernet network, a local area network (LAN), a wireless local area network (WLAN), a combination of any of such types of networks, and the like. As also illustrated in FIG. 1, local network 110 may include a user device 112 and several printing devices 114, 115, and 116. In one example, local network 110 may comprises devices that are deployed in the same physical location. However, in another example, local network 110 may comprise a plurality of devices distributed in several physical locations, e.g., connected through a virtual private network (VPN), a permanent virtual circuit (PVC), and the like.

Communication network 120 may comprise a single network, or an integrated network that may include a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and so forth. It should be noted that an IP network is broadly defined as a network that uses Internet Protocol to exchange data packets. In one example, the communication network 120 may comprise a core network of a telecommunications service provider and one or more access networks, e.g., an Internet service provider (ISP) network. The communication network 120 may be operated by a single telecommunications service provider or by a combination of several different telecommunications service providers. In one example, the communication network 120 may represent the Internet in general.

First network-based service provider network 130 may comprise a network of an entity that provides a network-based service. In one example, first network-based service provider network 130 may comprise a network of a manufacturer of printing devices 114, 115, and 116. In one example, first network-based service provider network 130 may comprise any one or more of a TCP/IP network, an Ethernet network, a LAN, a WLAN, a combination of any of such types of networks, and the like. In one example, first network-based service provider network 130 may comprise devices that are deployed in the same physical location. However, in another example, first network-based service provider network 130 may comprise a plurality of devices distributed in several physical locations, e.g., connected through a VPN, a PVC, and the like.

Figure 6:
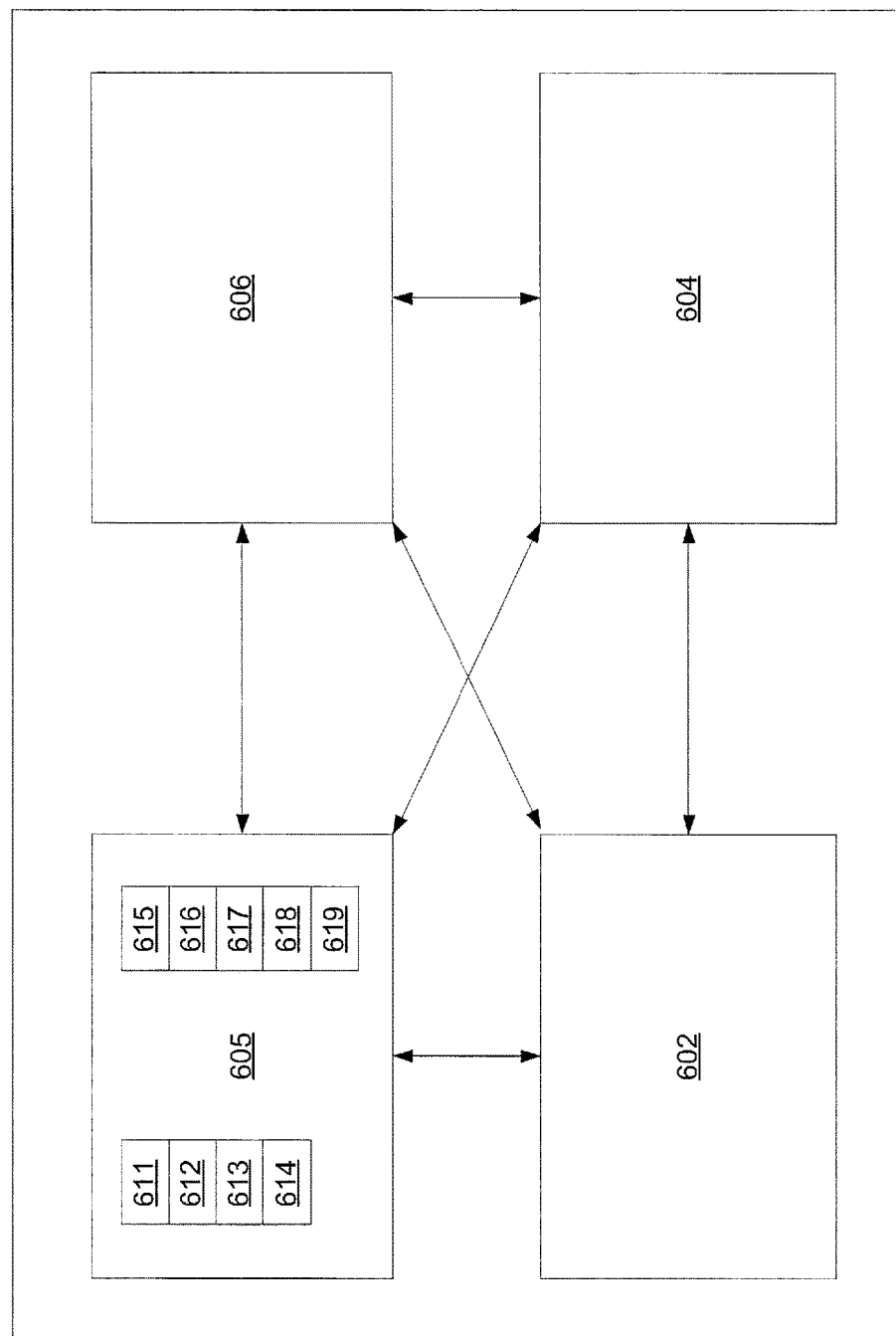
FIG. 6 depicts a high-level block diagram of an example computer that can be transformed into a machine capable of performing the functions described herein.

In one example, first network-based service provider network 130 may include a server 135. In one example, server 135 may comprise a computing device 600 as illustrated in FIG. 6 and discussed below. In one example, server 135 may comprise a web server for serving a webpage containing an image. In one example, the image contains a command and registration data encoded within the image to enable a printing device to register with a network-based service of the first network-based service provider network 130.

To illustrate, in one example, a user may connect user device 112 to server 135 by navigating a web browser of user device 112 to a webpage of the network-based service of the first network-based service provider network 130. In one example, the user may enter login credentials of a user account of the network-based service of the first network-based service provider network 130 in order to login to the network-based service. Through interactions with the server 135 via user device 112, the user may indicate an intent to register a printing device with the network-based service. In one example, server 135 may provide a webpage that contains an image encoded with a command for a printing device to connect to server 135 in order to register the printing device with the network-based service. The image may also include registration data, e.g., an identification of the user account of the network-based service to which the printing device should be associated. If the user intends to register printing device 114, the user may submit a print request to printing device 114 comprising the image that is provided by server 135 to the web browser of user device 112. Printing device 114 may then receive the print request and detect that the visual image contains an encoded command and registration data.

In one example, registration with the network-based service of the first network-based service provider network 130 may comprise printing device 114 submitting the registration data and an identifier of the printing device to server 135 in response to receiving the print request comprising the image containing the command. In one example, the identification of the printing device may uniquely identify the printing device, and may comprise such parameters as an IP address of the printing device, a serial number of the printing device, a media access control (MAC) address of a network interface card (NIC) of the printing device, and so forth. In one example, server 135 may associate printing device 114 with the user account of the network-based service of first network-based service provider network 130. In addition, in one example, server 135 may provide a verification to printing device 114 that registration with the network-based service is successfully completed.

Although a single server 135 is illustrated in the first network-based service provider network 130, in one example the functions of server 135 may be distributed across additional servers. For instance, a first server may be deployed for serving webpages and interacting with user devices, while a second server may be deployed for receiving registration requests from printing devices, for interacting with printing devices in connection with providing the network-based service, and forth. In another example, first network-based service provider network 130 may include backup servers, overflow servers, mirror servers, and the like to provide functions redundant or supplemental to server 135.

As described above, in one example, a registration of a first printing device may serve to register a fleet of printing devices, e.g., where other printing devices were anonymously detected by the network-based service. Thus, in one example the registration process described above for printing device 114 may also serve to register printing devices 115 and 116. For instance, printing device 115 and 116 may have been connected to local network 110 prior to printing device 114 and may have transmitted initial connectivity information to server 135 to indicate that printing devices 115 and 116 are ready for registration. Server 135 may track that printing devices 114, 115, and 116 are in the same local network 110 such that when printing device 114 is registered as described above, printing devices 115 and 116 may also be registered with the network-based service and associated with the same user account.

As illustrated in FIG. 1, system 100 may include additional network-based service provider networks 140 and 150. In one example, additional network-based service provider networks 140 and 150 may have similar components and similar structures as the first network-based service provider network 130. For example, server 145 and server 155 may provide similar functions as server 135 of the first network-based service provider network 130. Although server 145 and server 155 are illustrated as individual devices, it should be noted that the respective additional network-based service provider networks 140 and 150 may employ multiple servers to provide the same functions.

In one example, server 145 and server 155 may provide different URLs and/or different webpages for providing different encoded images for registering printing devices with the respective network-based services of additional network-based service provider networks 140 and 150.

Servers 145 and 155 may also communicate directly with the printing devices 114, 115, and or 116, once the printing devices are registered with the respective network-based services of additional network-based service provider networks 140 and 150. However, in another example, server 135 of the first network-based service provider network 130 may function as a gateway for the network-based services of additional network-based service provider networks 140 and 150. In this regard, server 135 may provide images to user device 112 for registering any of printing devices 114-116. Server 135 may also register one or more of the printing devices 114-116 and provide authorizations to server 145 and/or server 155 to communicate with the one or more of printing devices 114-116 in local network 110. For instance, a user, via user device 112, may indicate to server 135 that the printing device 114 should be registered with the network-based service of network-based service provider network 140. In one example, server 135 may provide a security token to enable server 145 to communicate with printing device 114 after printing device 114 attempts to register. However, in another example, after successful registration with the network-based service of network-based service provider network 140, communications between server 145 and printing device 114 may still be routed via server 135 for security and authorization.

It should be noted that the network 100 has been simplified. For example, the network 100 may include other network elements (not shown) such as border elements, routers, switches, policy servers, security devices, gateways, a content distribution network (CDN) and the like.

Figure 2:
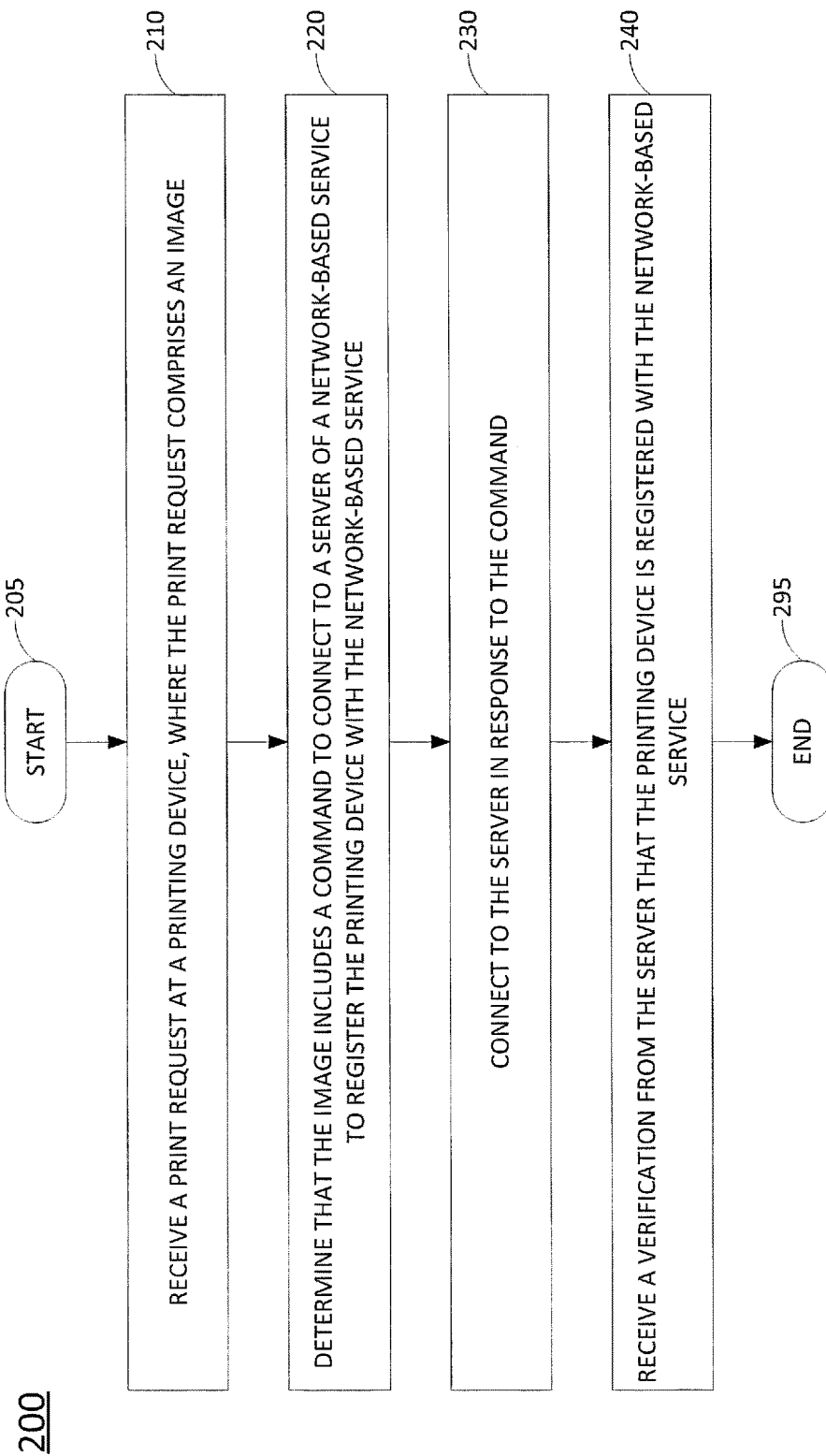
FIG. 2 illustrates a flowchart of an example method for registering a printing device with a network-based service.

FIG. 2 illustrates a flowchart of an example method 200 for registering a printing device with a network-based service. The method 200 may be performed, for example, by any one or more of the components of the system 100 illustrated in FIG. 1. For example, the method 200 may be performed by one of the printing devices 114-116. However, the method 200 is not limited to implementation with the system 100 illustrated in FIG. 1, but may be applied in connection with any number of systems and communication networks. Alternatively, or in addition, one or more blocks of the method 200 may be implemented by a printing device, e.g., a computing device having a processor, a memory, and input/output devices as illustrated below in FIG. 6, specifically programmed to perform the blocks of the method. Although any one of the elements in system 100 of FIG. 1, or in a similar system, may be configured to perform various blocks of the method 200, the method will now be described in terms of an example where blocks of the method 200 are performed by a processor, such as processor 602 in FIG. 6. For example, processor 602 may comprise a processor of a printing device.

The method 200 begins in block 205. In block 210, the processor receives a print request at a printing device, where the print request comprises an image. In one example, the image is encoded with a command for the printing device to connect to a server of a network-based service and registration data, e.g., comprising an identification of the user account of the network-based service to which the printing device should be associated. In one example, an encoding format may comprise a solid bar of black, followed by a bar code, followed by failover instructions. The solid bar of black may signal that a command bar code follows. The bar code may provide the actual command, including instructions to connect to a server of a network-based service and the registration data, as well as a checksum to prove that the bar code was interpreted correctly. The failover instructions may provide instructions, e.g., in readable text format, for an alternate (manual) way to connect, if automatic registration fails. In another example, the command may take the form of a two-dimensional bar code or a quick response (QR) code, a color coded image, e.g., a multi-colored bar code, and so on. In general, a variety of different visual encoding formats may be utilized in connection with the present disclosure.

In block 220, the processor determines that the image includes a command to connect to a server of a network-based service to register the printing device with the network-based service. In one example, the processor extracts the command and the registration data from the image that is received in the print request.

In block 230, the processor connects to the server of the network-based service in response to the command. In one example, the processor submits the registration data, e.g., including an identification of the user account to which the printing device should be associated, and an identification of the printing device to the server. In one example, the command comprises an address of the server, e.g., a URL, an IP address, or other type of link or pointer that the processor may use to connect to the server over one or more networks using a network interface card (NIC) or similar component of the printing device. In one example, the command that is encoded in the image received at block 210 may include a digital signature of the network-based service. In one example, the processor may access a stored credential that may be contained in a hardware portion, a firmware, or in a trusted software module of the printing device to compare to the digital signature. Where there is a match, the processor may determine that the command has been generated by a trusted entity. As such, the processor may commence with block 230 upon such determination.

In block 240, the processor receives a verification from the server that the printing device is registered with the network-based service. In one example, the registration is completed upon the printing device being associated with the user account that is identified in the registration data encoded in the image of the print request received at block 210. In one example, the verification includes a digital signature of the network-based service, such that the processor may confirm that the verification is received from a trusted entity. For instance, the processor may compare the digital signature to a stored credential that may be contained in a hardware portion, a firmware, or in a trusted software module of the printing device. In one example, the digital signature and stored credential may comprise the same digital signature and stored credential as described above in connection with block 230. In another example, the digital signatures and stored credentials of blocks 230 and 240 are different.

Following block 240, the method 200 proceeds to block 295 where the method ends.

Figure 3:
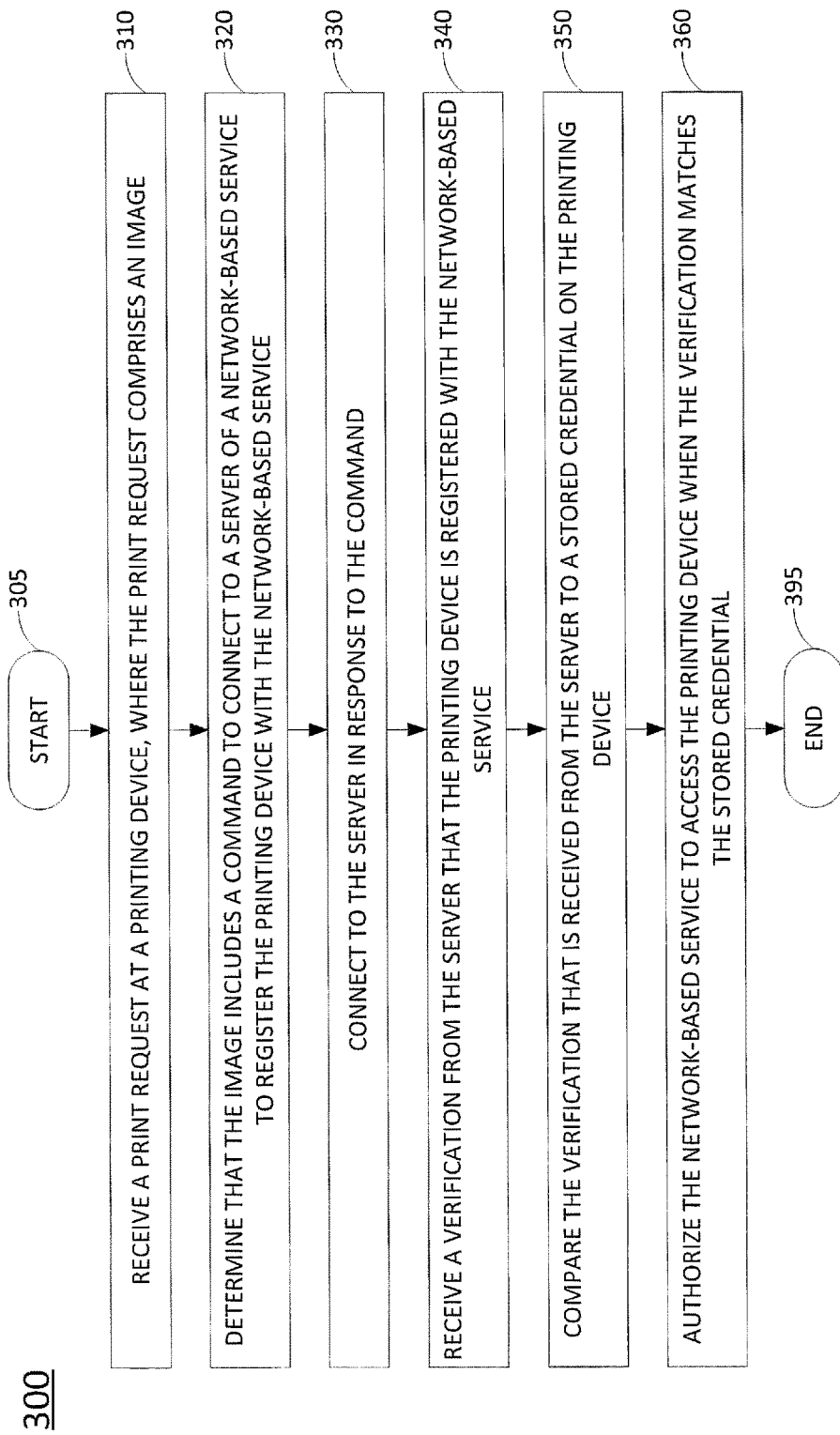
FIG. 3 illustrates a flowchart of an additional example method for registering a printing device with a network-based service.

FIG. 3 illustrates a flowchart of an additional example method 300 for registering a printing device with a network-based service. The method 300 may be performed, for example, by any one or more of the components of the system 100 illustrated in FIG. 1. For example, the method 300 may be performed by one of the printing devices 114-116. However, the method 300 is not limited to implementation with the system 100 illustrated in FIG. 1, but may be applied in connection with any number of systems and communication networks. Alternatively, or in addition, one or more blocks of the method 300 may be implemented by a printing device, e.g., a computing device having a processor, a memory, and input/output devices as illustrated below in FIG. 6, specifically programmed to perform the blocks of the method. Although any one of the elements in system 100 of FIG. 1, or in a similar system, may be configured to perform various blocks of the method 300, the method will now be described in terms of an example where blocks of the method are performed by a processor, such as processor 602 in FIG. 6. For example, processor 602 may comprise a processor of a printing device.

The method 300 begins in block 305. In block 310, the processor receives a print request at a printing device, where the print request comprises an image. In one example, the image is encoded with a command for the printing device to connect to a server of a network-based service and registration data, e.g., comprising an identification of the user account of the network-based service to which the printing device should be associated. In one example, the operations of block 310 may comprise the same or similar operations to those described above in connection with block 210 of FIG. 2.

In block 320, the processor determines that the image includes a command to connect to a server of a network-based service to register the printing device with the network-based service. In one example, the processor extracts the command and the registration data from the image that is received in the print request. In one example, the operations of block 320 may comprise the same or similar operations to those described above in connection with block 220 of FIG. 2.

In block 330, the processor connects to the server of the network-based service in response to the command. In one example, the processor submits the registration data, e.g., including an identification of the user account to which the printing device should be associated, and an identification of the printing device to the server. In one example, the operations of block 330 may comprise the same or similar operations to those described above in connection with block 230 of FIG. 2.

In block 340, the processor receives a verification from the server that the printing device is registered with the network-based service. In one example, the operations of block 340 may comprise the same or similar operations to those described above in connection with block 240 of FIG. 2.

In block 350, the processor compares the verification that is received from the server to a stored credential on the printing device. For instance, the verification may include a digital signature of the network-based service, such that the processor may confirm that the verification is received from a trusted entity when the digital signatures matches the stored credential. In one example, the stored credential may be contained in a hardware portion, a firmware, or in a trusted software module of the printing device. In various examples, the digital signature may comprise the same or a different digital signature from a digital signature that is used to encode the command contained in the image received at block 310.

In block 360, the processor authorizes the network-based service to access the printing device when the verification matches the stored credential. In one example, the authorization may permit one or more devices, e.g., servers or other components of the network-based service, to send commands to the printing device to cause the printing device to perform various operations such as to print a document, to change settings, to perform a print-head cleaning routine, and so forth, and to receive reports and other communications from the printing device, such as reports on printing fluid levels in the printer cartridges, heat status, idle time or percent utilization, and so on.

Following block 360, the method 300 proceeds to block 395 where the method ends.

Figure 4:
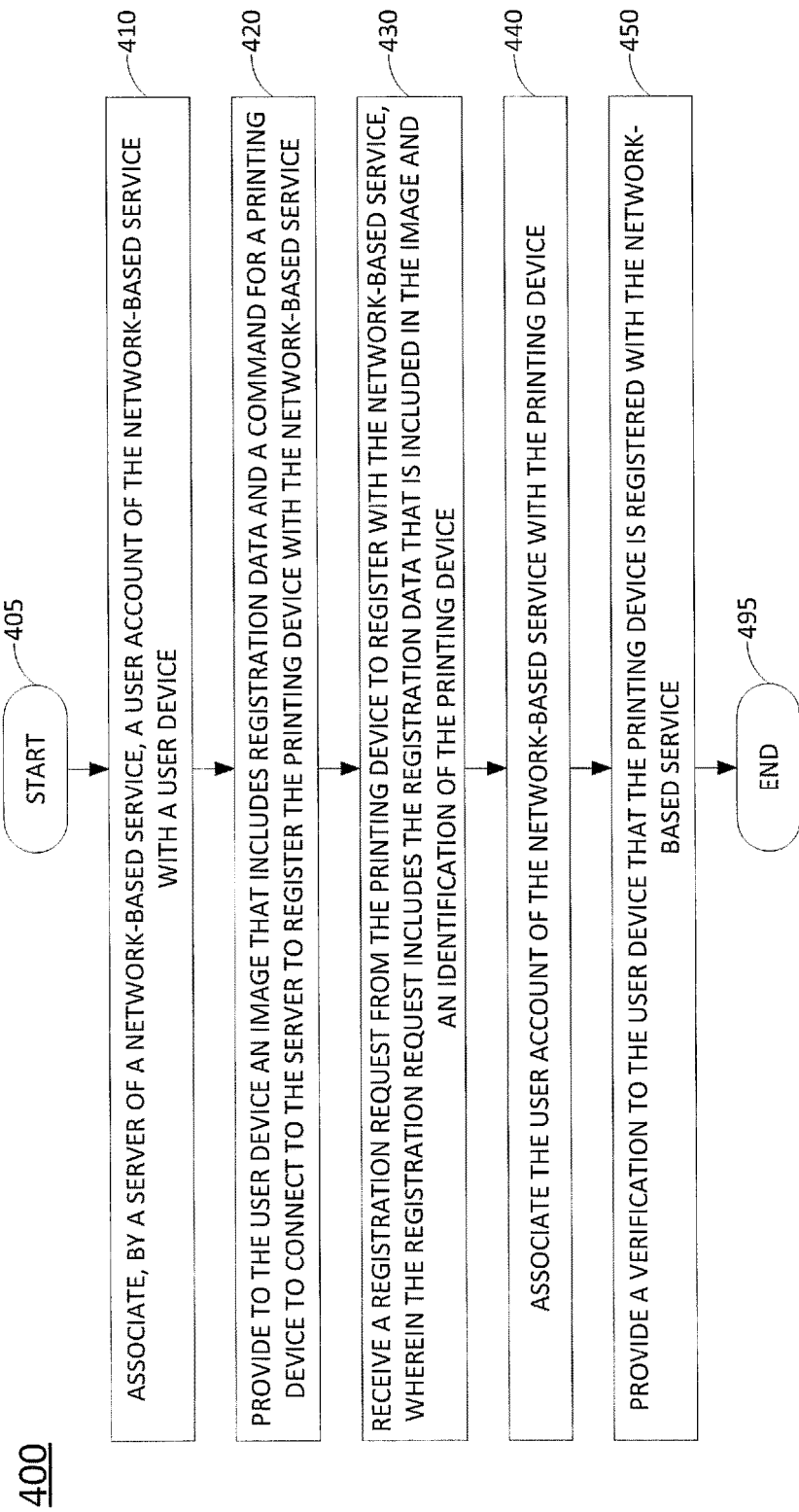
FIG. 4 illustrates a flowchart of an example method for registering a printing device with a network-based service by a server of the network-based service.

FIG. 4 illustrates a flowchart of an example method 400 for registering a printing device with a network-based service, e.g., by a server of the network-based service. The method 400 may be performed, for example, by any one or more of the components of the system 100 illustrated in FIG. 1. For example, the method 400 may be performed by server 135, or by one of the servers 145 or 155. However, the method 400 is not limited to implementation with the system 100 illustrated in FIG. 1, but may be applied in connection with any number of systems and communication networks. Alternatively, or in addition, one or more blocks of the method 400 may be implemented by a server of a network-based service, e.g., a computing device having a processor, a memory, and input/output devices as illustrated below in FIG. 6, specifically programmed to perform the blocks of the method. Although any one of the elements in system 100 of FIG. 1, or in a similar system, may be configured to perform various blocks of the method 400, the method will now be described in terms of an example where blocks of the method are performed by a processor, such as processor 602 in FIG. 6. For example, processor 602 may comprise a processor of a server of a network-based service.

The method 400 begins in block 405. In block 410, the processor associates a user account of a network-based service with a user device. For example, a user may login to the network-based service by providing credentials of the user account to a server of the network-based service via a web browser of the user device. Thus, the processor may determine that the user device is associated with the particular user account.

In block 420, the processor provides to the user device an image that includes registration data and a command for a printing device to connect to the network-based server to register the printing device with the network-based service. In one example, the command and the registration data are encoded in the image in a format that is detectable by the printing device. For instance, an encoding format may comprise a solid bar of black, followed by a bar code, followed by failover instructions. The solid bar of black may signal that a command bar code follows. The bar code may provide the actual command, including instructions to connect to a server of a network-based service and registration data, as well as a checksum to prove that the bar code was interpreted correctly. The failover instructions may provide instructions, e.g., in readable text format, for an alternate (manual) way to connect, if automatic registration fails. In another example, the command may take the form of a two-dimensional bar code or a quick response (QR) code, a color coded image, e.g., a multi-colored bar code, and so on. In general, a variety of different visual encoding formats may be utilized in connection with the present disclosure.

In one example, the image is provided to the user device via a webpage. In one example, the instructions to connect to the server may include an address of the server, e.g., a URL, an IP address, or other type of link or pointer that the printing device may use to connect to the server. In one example, the registration data contained in the image comprises an identification of the user account that was associated with the user device at block 410. In other words, in one example, the registration data is specific to each user account that is used in connection with registering a printing device with the network-based service. In addition, in one example, the command and registration data may be digitally signed by the processor. For instance, the command and registration data may be authenticated by the printing device when the digital signature matches a security token contained on the printing device. In one example, the security token may be included in the printing device by a manufacturer for this purpose.

In block 430, the processor receives a registration request from the printing device to register with the network-based service. In one example, the registration request may include registration data that is included in the image and an identification of the printing device. In one example, the registration request is received by the server in response to the printing device executing the command. For instance, the image may be received by the printing device in response to a print request from the user device to print the image. The printing device may then extract the command and the registration data from the image and execute the command in order submit the registration request.

In block 440, the processor associates the user account of the network-based service with the printing device. In one example, the association enables the network-based service to access the printing device for various functions of the network-based service in connection with the user account. For instance, the user account may be associated with a cloud-based desktop, and the network-based service may comprise a print server for the cloud-based desktop. As such, the user may then print documents from the cloud-based desktop to the printing device via the network-based service (e.g., a cloud-based, or network-based print server). In one example, the association of the user account of the network-based service with the printing device completes the registration of the printing device with the network-based service.

In block 450, the processor provides a verification to the user device that the printing device is registered with the network-based service. In one example, the processor may include a digital signature of the network-based service in the verification, such that the printing device may confirm that the verification is received from a trusted entity. For instance, the printing device may compare the digital signature to a stored credential of the printing device. In various example, the digital signature may comprise the same or a different digital signature from the digital signature described above in connection with block 420.

Following block 450, the method 400 proceeds to block 495 where the method ends.

Figure 5:
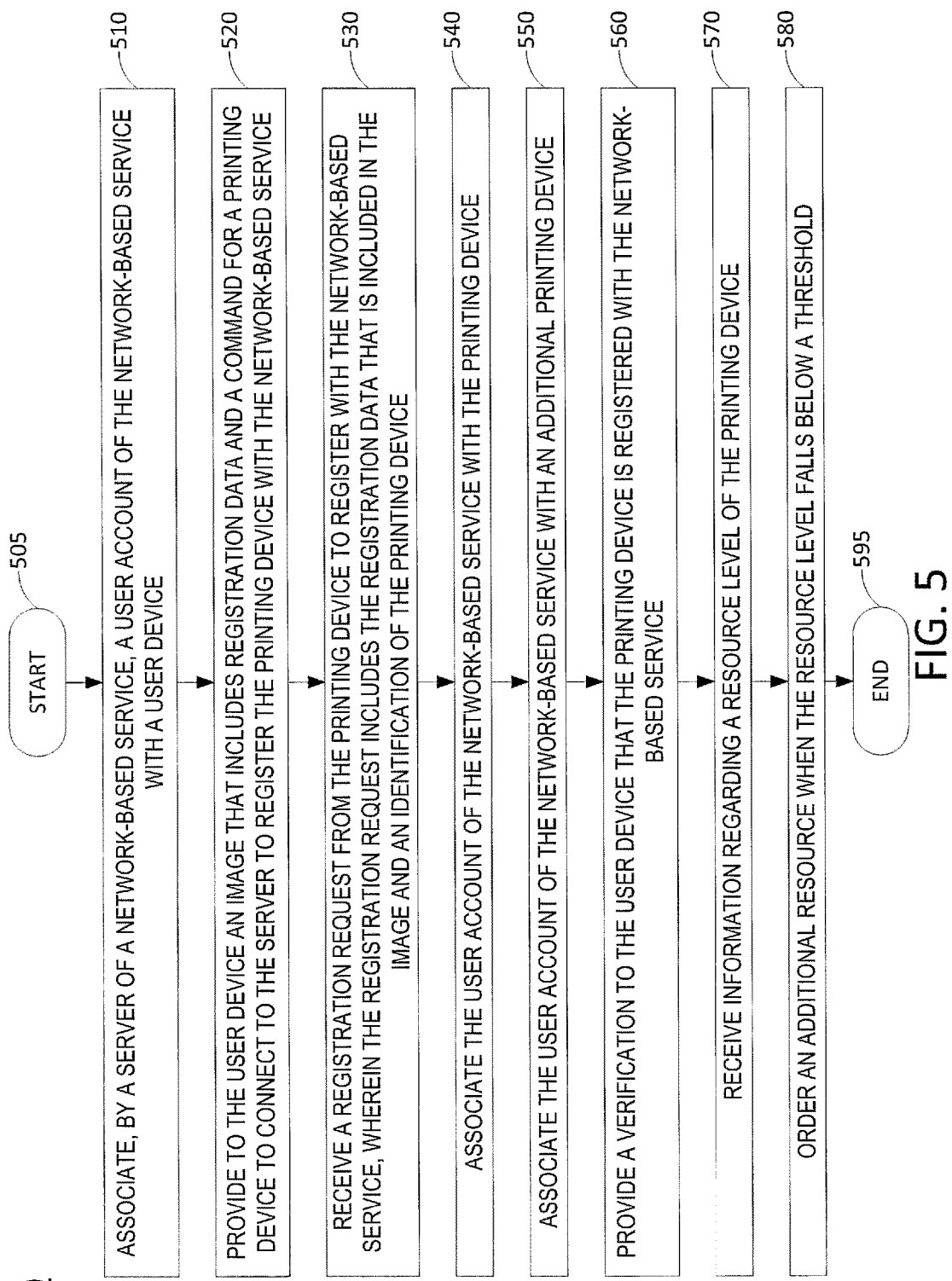
FIG. 5 illustrates a flowchart of an additional example method for registering a printing device with a network-based service by a server of the network-based service.

FIG. 5 illustrates a flowchart of an example method 500 for registering a printing device with a network-based service, e.g., by a server of the network-based service. The method 500 may be performed, for example, by any one or more of the components of the system 100 illustrated in FIG. 1. For example, the method 500 may be performed by server 135, or by one of the servers 145 or 155. However, the method 500 is not limited to implementation with the system 100 illustrated in FIG. 1, but may be applied in connection with any number of systems and communication networks. Alternatively, or in addition, one or more blocks of the method 500 may be implemented by a server of a network-based service, e.g., a computing device having a processor, a memory, and input/output devices as illustrated below in FIG. 6, specifically programmed to perform the blocks of the method. Although any one of the elements in system 100 of FIG. 1, or in a similar system, may be configured to perform various blocks of the method 500, the method will now be described in terms of an example where blocks of the method are performed by a processor, such as processor 602 in FIG. 6. For example, processor 602 may comprise a processor of a server of a network-based service.

The method 500 begins in block 505. In block 510, the processor associates a user account of a network-based service with a user device. In one example, the operations of block 510 may comprise the same or similar operations to those described above in connection with block 410 of FIG. 4.

In block 520, the processor provides to the user device an image that includes registration data and a command for a printing device to connect to the network-based server to register the printing device with the network-based service. In one example, the operations of block 520 may comprise the same or similar operations to those described above in connection with block 420 of FIG. 4.

In block 530, the processor receives a registration request from the printing device to register with the network-based service. In one example, the operations of block 530 may comprise the same or similar operations to those described above in connection with block 430 of FIG. 4.

In block 540, the processor associates the user account of the network-based service with the printing device. In one example, the operations of block 540 may comprise the same or similar operations to those described above in connection with block 440 of FIG. 4.

In block 550, the processor associates the user account of the network-based service with an additional printing device. For example, the processor may determine that one or more additional printing devices have anonymously connected to and/or been detected by the network-based service (e.g., by the processor and/or by a server or other component of the network-based service) and are located on the same local network as the printing device from which the registration request is received at block 530. In addition, as described above, the processor may treat a registration request from any printing device on a local network as a registration request with respect to all printing devices that are on the same local network. In one example, the association of the user account of the network-based service with the additional printing device completes the registration of the additional printing device with the network-based service. As such, one or more devices, e.g., servers or other components of the network-based service, may then be permitted to send commands to both the printing device from which the registration request is received at block 530 and the additional printing device to cause the respective printing devices to perform various operations, such as to print a document, to change settings, to perform a print-head cleaning routine, and so forth, and to receive reports and other communications from the respective printing devices, such as reports on printing fluid levels in the printer cartridges, heat status, idle time or percent utilization, and so on.

In block 560, the processor provides a verification to the user device that the printing device is registered with the network-based service. In one example, the processor may include a digital signature of the network-based service in the verification, such that the printing device may confirm that the verification is received from a trusted entity. In one example, the operations of block 560 may comprise the same or similar operations to those described above in connection with block 450 of FIG. 4.

In block 570, the processor receives information regarding a resource level of the printing device. For instance, the network-based service may comprise a printing device resource monitoring service. Thus, in one example, the printing device may report the printing fluid level(s) of cartridge(s) within the printing device. In one example, the information regarding the resource level may be reported in response to a status inquiry from the processor. In another example, the printing device may transmit the information regarding the resource level according to a schedule.

In block 580, the processor orders an additional resource when the resource level falls below a threshold. For instance, the processor may order a replacement cartridge, additional staples, and so forth, when it is determined that the resource level falls below the threshold. The threshold may take various forms such as a percentage remaining (e.g., of printing fluid, staples, paper, etc.), a number of pages remaining, and so forth.

Following block 580, the method 500 proceeds to block 595 where the method ends.

It should be noted that although not explicitly specified, one or more blocks, functions, or operations of the methods 200, 300, 400, and 500 described above may include storing, displaying, and/or outputting. In other words, any data, records, fields, and/or intermediate results discussed in the methods can be stored, displayed, and/or outputted to another device depending on the particular application. Furthermore, blocks, functions, or operations in FIGS. 2-5 that recite a determining operation, or involve a decision, do not necessarily imply that both branches of the determining operation are practiced. In other words, one of the branches of the determining operation can be deemed as optional. In addition, various blocks of the respective methods 200, 300, 400, and 500 may be considered optional in various examples. For instance, in one example, method 500 may omit blocks 570 and 580. In another example, method 500 may omit block 550. In addition, it should be noted that the respective method 200, 300, 400, and 500 may also be expanded to include additional operations and functions as described above in connection with various examples.

FIG. 6 depicts a high-level block diagram of a computing device suitable for use in performing the functions described herein. As depicted in FIG. 6, the computer 600 comprises a hardware processor element 602, e.g., a central processing unit (CPU), a microprocessor, or a multi-core processor, a memory 604, e.g., random access memory (RAM), a module 605 for registering a printing device with a network-based service, and various input/output devices 606, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one computer is shown in the figure, if the method(s) as discussed above is implemented in a distributed or parallel manner for a particular illustrative example, i.e., the blocks of the above method(s) or the entire method(s) are implemented across multiple or parallel computers, then the computer of this figure is intended to represent each of those multiple computers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 605 for registering a printing device with a network-based service, e.g., machine readable instructions can be loaded into memory 604 and executed by hardware processor element 602 to implement the blocks, functions, or operations as discussed above in connection with the example methods 200, 300, 400, and 500. Furthermore, when a hardware processor executes instructions to perform "operations," this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 605 for registering a printing device with a network-based service, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

FIG. 6 depicts an example high-level block diagram of a computing device suitable for use in performing the functions of a printing device or a server of a network-based service as described herein. As depicted in FIG. 6, the computer 600 comprises a hardware processor element 602, e.g., a central processing unit (CPU), a microprocessor, or a multi-core processor, a memory 604, e.g., random access memory (RAM), a module 605 for registering a printing device with a network-based service, and various input/output devices 606, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the computer may employ a plurality of processor elements. Furthermore, although one computer is shown in the figure, if the method(s) as discussed above is implemented in a distributed or parallel manner for a particular illustrative example, i.e., the blocks of the above method(s) or the entire method(s) are implemented across multiple or parallel computers, then the computer of this figure is intended to represent each of those multiple computers.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a computer or any other hardware equivalents, e.g., computer-readable instructions pertaining to the method(s) discussed above can be used to configure a hardware processor to perform the blocks, functions and/or operations of the above disclosed methods.

In one example, instructions and data for the present module or process 605 for registering a printing device with a network-based service, e.g., machine readable instructions, can be loaded into memory 604 and executed by hardware processor element 602 to implement the blocks, functions, or operations as discussed above in connection with the example methods 200, 300, 400, and 500. For instance, in one example, the module 605 may include a plurality of computer-readable components, including a receive a print request component 611, a determine an image includes a command component 612, a connect to a server component 613, and a receive a verification component 614. When executed by the hardware processor element 602, the receive a print request component 611 may cause the hardware processor element 602 to receive a print request comprising an image, the determine an image includes a command component 612 may cause the hardware processor element 602 to determine that the image includes a command to connect to a server of a network-based service to register a printing device with the network-based service, the connect to a server component 613 may cause the hardware processor element 602 to connect to the server in response to the command, and the receive a verification component 614 may cause the hardware processor element 602 to receive a verification form the server that the printing device is registered with the network-based service. For example, the foregoing configuration of module 605 may cause the hardware processor element 605 and/or the computing device of FIG. 6 to perform the functions of a printing device of the present disclosure. The foregoing is just one example configuration of module 605 in accordance with the present disclosure.

In another example, the module 605 may include a different plurality of computer-readable components, including an associate a user account with a user device component 615, a provide an image component 616, a receive a registration request component 617, an associate a user account with a printing device component 618, and a provide a verification component 619. When executed by the hardware processor element 602 the associate a user account with a user device component 615 may cause the hardware processor element 602 to associate a user account of a network-based service with a user device, the provide an image component 616 may cause the hardware processor element 602 to provide to the user device an image that includes registration data and a command for a printing device to connect to a server of the network-based service, the receive a registration request component 617 may cause the hardware processor element 602 to receive a registration request from the printing device that includes the registration data that is included in the image and an identification of the printing device, the associate a user account with a printing device component 618 may cause the hardware processor element 602 to associate the user account of the network-based service with the printing device, and the provide a verification component 619 may cause the hardware processor element 602 to provide a verification to the user device that the printing device is registered with the network-based service. For example, the foregoing configuration of module 605 may cause the hardware processor element 602 and/or the computing device of FIG. 6 to perform the functions of a server of a network-based service of the present disclosure.

Furthermore, when a hardware processor executes instructions to perform "operations," this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 605 for registering a printing device with a network-based service, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, the computer-readable storage device may comprise any physical device or devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made, which are also intended to be encompassed by the following claims.

What is claimed is:

1. A method comprising:
   receiving a print request at a printing device, wherein the print request comprises an image;
   determining, by the printing device, that the image includes a command to connect to a server of a network-based service to register the printing device with the network-based service, wherein the command comprises an executable instruction encoded into visual data of the image;
   connecting, by the printing device, to the server in response to the command; and
   receiving, by the printing device, a verification from the server that the printing device is registered with the network-based service.

2. The method of claim 1, wherein the print request is received from a user device, wherein the image comprises an image of a webpage retrieved by the user device, and the webpage is provided by the network-based service.

3. The method of claim 1, wherein the image further includes registration data, wherein the registration data identifies a user account of the network-based service that is associated with a user device, wherein the connecting to the server comprises transmitting to the server the registration data and an identification of the printing device.

4. The method of claim 3, wherein an access to the user account from the user device is received by the network-based service prior to the connecting, by the printing device, to the server.

5. The method of claim 1, further comprising:
   comparing the verification that is received from the server to a stored credential on the printing device; and
   authorizing the network-based service to access the printing device when the verification matches the stored credential.

6. The method of claim 5, where the stored credential is embedded in a hardware of the printing device.

7. The method of claim 1, wherein the network-based service is provided by the server.

8. The method of claim 1, wherein the network-based service is provided by at least one network-based device other than the server.

9. The method of claim 1, wherein the network-based service comprises a gateway for an additional network-based service or a printing device resource monitoring service.

10. The method of claim 8, wherein the printing device resource monitoring service includes:
monitoring a resource level of the printing device; and
ordering an additional resource when the resource level falls below a threshold.

11. The method of claim 1, wherein the network-based service comprises a network-based print server service.

12. A method comprising:
associating, by a server of a network-based service, a user account of the network-based service with a user device;
providing, by the server to the user device, an image that includes registration data and a command for a printing device to connect to the server to register the printing device with the network-based service, wherein the command is an executable instruction encoded into visual data of the image;
receiving, by the server, a registration request from the printing device to register with the network-based service, wherein the registration request includes the registration data that is included in the image and an identification of the printing device, wherein the image is received by the printing device in response to a print request from the user device to print the image, wherein the printing device extracts the command and the registration data from the image, and wherein the registration request is received by the server in response to the printing device executing the command;
associating, by the server, the user account of the network-based service with the printing device; and
providing, by the server, a verification to the user device that the printing device is registered with the network-based service.

13. The method of claim 12, wherein the network-based service comprises a printing device resource monitoring service.

14. The method of claim 13, further comprising:
receiving, by the server, information regarding a resource level of the printing device; and
ordering, by the server, an additional resource when the resource level falls below a threshold.

15. The method of claim 12, further comprising:
associating the user account of the network-based service with an additional printing device, wherein the user device, the printing device and the additional printing device are on a same local area network, and wherein the additional printing device was detected by the server prior to the receiving, by the server, the registration request from the printing device to register with the network-based service.

16. A printing device comprising:
a processor; and
a non-transitory computer-readable medium storing instructions which, when executed by the processor, cause the processor to:
receive a print request, wherein the print request comprises an image;
determine that the image includes a command to connect to a server of a network-based service to register the printing device with the network-based service, wherein the command is an executable instruction encoded into visual data of the image;
connect to the server in response to the command; and
receive a verification from the server that the printing device is registered with the network-based service.

17. The printing device of claim 16, wherein the non-transitory computer-readable medium stores further instructions which, when executed by the processor, cause the processor to:
compare the verification that is received from the server to a stored credential on the printing device; and
authorize the network-based service to access the printing device when the verification matches the stored credential.

18. The method of claim 1, wherein the command comprises a first encoded portion signaling that the executable instruction is encoded in the image, and a second encoded portion including the executable instruction, and
wherein determining, by the printing device, that the image includes a command comprises determining the image includes the command in response to recognizing the first encoded portion is in the image.

19. The method of claim 18, wherein the command comprises a third encoded portion comprising a checksum, and the method comprises:
determining whether the second encoded portion including the executable instruction is authenticated based on the checksum.

20. The method of claim 1, wherein the command further includes failover instructions encoded in the image, and the method comprises:
if registering the printing device fails, printing the failover instructions to facilitate registering the printing device.

* * * * *